United States Patent [19]

Mitani et al.

[11] Patent Number: 5,612,085
[45] Date of Patent: Mar. 18, 1997

[54] LENS HOLDER AND METHOD FOR MAKING A THIN FILM

[75] Inventors: Katsuaki Mitani; Masayuki Takahashi; Syunsuke Kimura, all of Ibaraki, Japan

[73] Assignee: Matsushita Electric Industrial Co., Ltd., Kadoma, Japan

[21] Appl. No.: 222,397

[22] Filed: Apr. 4, 1994

Related U.S. Application Data

[62] Division of Ser. No. 70,912, Jun. 4, 1993, Pat. No. 5,353,070.

[30] Foreign Application Priority Data

Jun. 8, 1992 [JP] Japan ................................. 4-147257

[51] Int. Cl.$^6$ ........................................ B05D 5/06
[52] U.S. Cl. .......................... 427/162; 427/64; 427/68; 427/240; 427/348; 427/377; 427/385.5; 427/430.1; 427/169
[58] Field of Search .............................. 427/240, 385.5, 427/162, 430.1, 348, 377, 64, 169

[56] References Cited

U.S. PATENT DOCUMENTS

| | | | |
|---|---|---|---|
| 4,004,851 | 1/1977 | Negishi et al. | 350/311 |
| 4,385,085 | 5/1983 | Verzwyvelt | 427/430.1 |
| 4,729,031 | 3/1988 | Saito et al. | 358/237 |
| 4,804,883 | 2/1989 | Miller et al. | 313/478 |
| 5,091,204 | 2/1992 | Ratner et al. | 427/166 |
| 5,138,222 | 8/1992 | Toide et al. | 313/474 |
| 5,181,141 | 1/1993 | Sato et al. | 359/580 |
| 5,254,367 | 10/1993 | Matsumura et al. | 427/240 |

FOREIGN PATENT DOCUMENTS 60-257402  12/1985  Japan .

OTHER PUBLICATIONS

Patent Abstracts of Japan, vol. 15, No. 250 (E–1082) 26 Jun. 1991, & JP–A–03 078 948.
Patent Absracts of Japan, vol. 16, No. 439, (P–1420) 14 Sep. 1992 & JP–A–04 153 602.
Patent Abstracts of Japan, vol. 5, No. 122 (P–794) & JP–A–56 065 102, 2 Jun. 1981.
Patent Abstracts of Japan, vol. 15, No. 507 (P–1291) 20 Dec. 1991 & JP–A–03 220 542.
Patent Abstracts of Japan, vol. 8, No. 265 (P–318) (1702) 5 Dec. 1984 & JP–A–59 135 405, 3 Aug. 1984.
Patent Abstracts of Japan, vol. 8, No. 208 (P–302) 21 Sep. 1984 & JP–A–59 093 416, 29 May 1984.
Tadashi Kojima, "Computer simulation analysis of ghost images in photographic objectives", SPIE International Lens Design Conference OSA, vol. 237, 1 Jan. 1980.

*Primary Examiner*—Janyce Bell
*Attorney, Agent, or Firm*—Cushman, Darby & Cushman IP Group of Pillsbury Madison & Sutro LLP

[57] ABSTRACT

Provided is a method for making a thin film on a lens holder to reduce a reflection of light caused by an index difference between a refractive index of air and a refractive index of a lens-barrel of the lens holder. The thin film is formed by dipping the lens holder into a solution of a solvent and a fluororesin compound or by dripping the solution onto the lens holder. The lens holder is removed from the solution. Then, the solvent is removed to thereby form a thin film of the fluororesin compound on the lens holder.

11 Claims, 9 Drawing Sheets

LENS HOLDER AND METHOD FOR MAKING A THIN FILM

This is a division of application Ser. No. 08/070,912, filed Jun. 4, 1993, now U.S. Pat. No. 5,353,070.

FIELD OF THE INVENTION AND RELATED ART STATEMENT

1. Field of the Invention

The present invention relates to a lens holder for holding a lens mounted in a camera or a projection type TV set etc. and a method for making a thin film particularly on an inner surface of a lens-barrel.

2. Description of the Related Art

In the conventional lens holder for a projection type TV set, in which a lens magnifies and projects images on a screen, an inner surface of a lens-barrel has a black coating thereon, or black material is used for the lens-barrel, thereby eliminating undesirable reflection of light from the inner surface of the lens-barrel.

The above-mentioned black material and black coating are capable of absorbing light by a native characteristic of black color. However, it is impossible to prevent reflection of light caused by an index difference between a refractive index of the black material or coating and a refractive index of air. A reflected light caused by this index difference acts as a stray light in the lens-barrel, and this stray light lowers contrast and clearness of image projected on a screen by the projection type TV set.

OBJECT AND SUMMARY OF THE INVENTION

An object of the present invention is to offer a lens holder which lowers an amount of the reflective light appearing on the inner surface of the lens-barrel, thereby to give high contrast and high clearness to the image on the screen.

In order to achieve the above-mentioned object, a lens holder of the present invention comprises:

a lens-barrel;

a thin film formed on an inner surface of the lens-barrel, the thin film being composed of a fluororesin compound having a refractive index lower than a refractive index of a material which constitutes the lens-barrel.

In another aspect, the lens holder of the present invention is made by the steps of:

dipping a lens holder in a solution of fluororesin compound; and raising the lens holder out of the solution.

According to the lens holder of the present invention, it can be avoided that unnecessary light enters the inner surface of the lens-barrel, and reflection of the stray light is prevented. Contrast of images is thereby improved, and bright, deep and clear images are obtained.

According to the method for making a thin film of the present invention, the antireflection film having an even thickness is obtained with a good productivity.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiments of the present invention are described with reference to the accompanying drawings.

Figure 1:
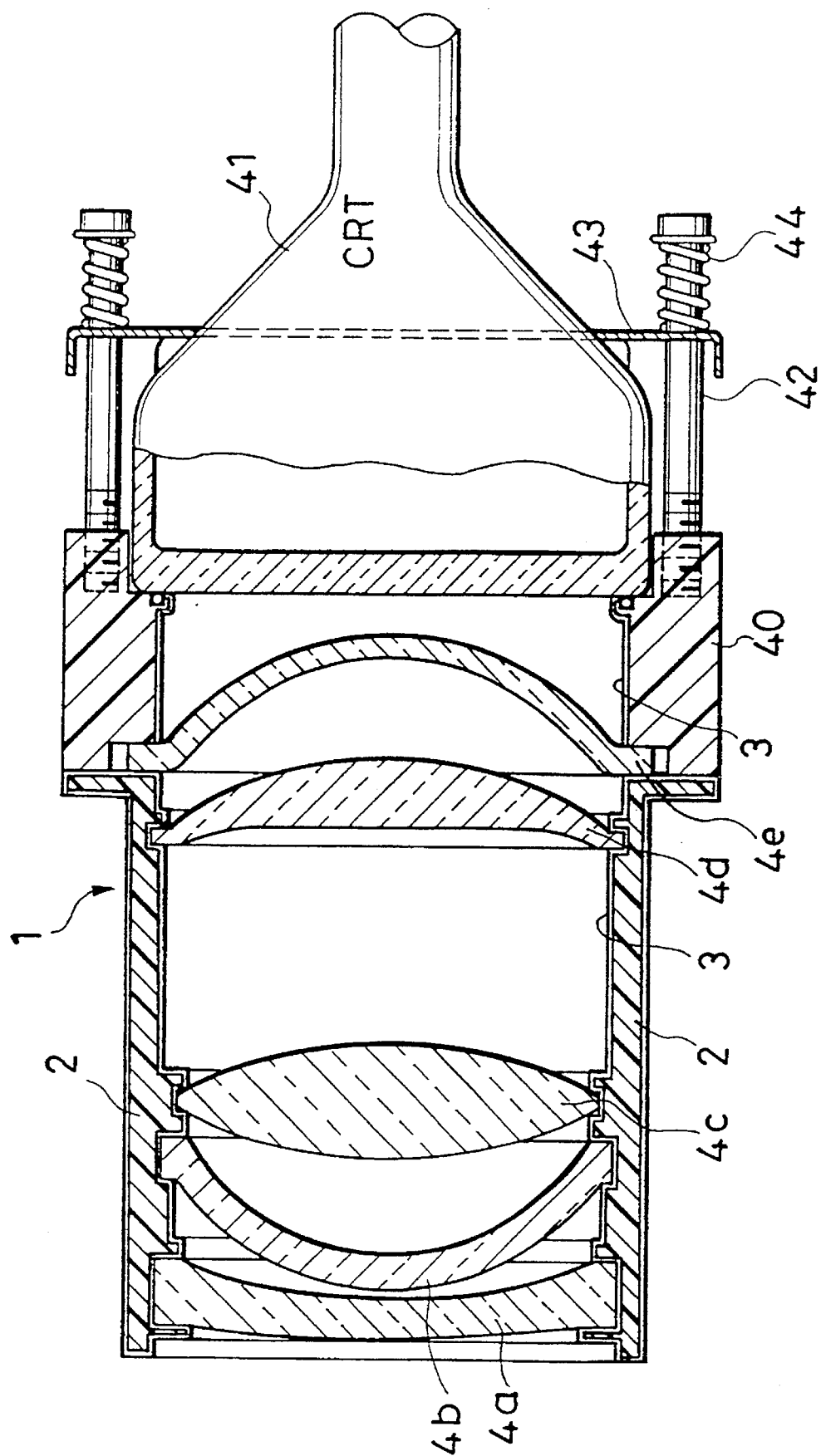
FIG. 1 is a cross-sectional view showing a lens holder coupled with a CRT.

FIG. 1 is a cross-sectional view showing a lens holder 1 coupled with a CRT (Cathode Ray Tube) 41. In this embodiment, a lens-barrel 2 and a coupler 40 act as the lens holder 1. Projection lenses 4a, 4b, 4c and 4d are held by the lens-barrel 2 in their predetermined locations, and a projection lens 4e is held by putting it between the lens-barrel 2 and the coupler 40. The lens-barrel 2 and the coupler 40 are connected with each other, and the coupler 40 is coupled with the CRT 41 by means of bolts 42, a fixing plate 43 and springs 44. An antireflection film 3 having a suitable thickness for reducing reflection is provided on the inner surface of the lens-barrel 2. A refractive index of the antireflection film 3 has a value lower than a refractive index of the lens-barrel 2 which is made of resin such as black polycarbonate (A refractive index is 1.58.), black polyphenylene oxide or black ABS resin.

In case the lens-barrel 2 is made of metal such as aluminum, black alumite treatment is applied, or black acrylic resin coating is provided on the inner surface of the lens-barrel 2. The antireflection film 3 is made of a specific material so that the refractive index of the antireflection film 3 may be lower than that of the black acrylic resin. $MKF_2$ (A refractive index is 1.38.) is well-known in the art as the antireflection film, and it can be formed into a thin film only by vacuum deposition. However, it is difficult in the vacuum deposition method to form a thin film having a uniform thickness on the inner surface of the lens holder Which has a complicated configuration in three dimensions such as one required for the lens-barrel 2.

The antireflection film 3 in this embodiment is made of a fluororesin compound of low refractive index. For example, a transparent fluororesin CYTOP (a trademark of ASAHI GLASS Co., Ltd, Japan) is suitable to the fluororesin component. This CYTOP is soluble in a special fluorine solvent such as 2-butyltetrahydrofuran (e.g., the solvent CT-Solv.100 presented by ASAHI GLASS Co., Ltd.). In this embodiment, the CYTOP solution CTL-102A (by ASAHI GLASS Co., Ltd.) is used. By dipping in and raising the lens-barrel 2 from the special fluorine solution with a constant speed, there remains a thin film having a uniform thickness on the surface of the lens-barrel 2.

Figure 2:
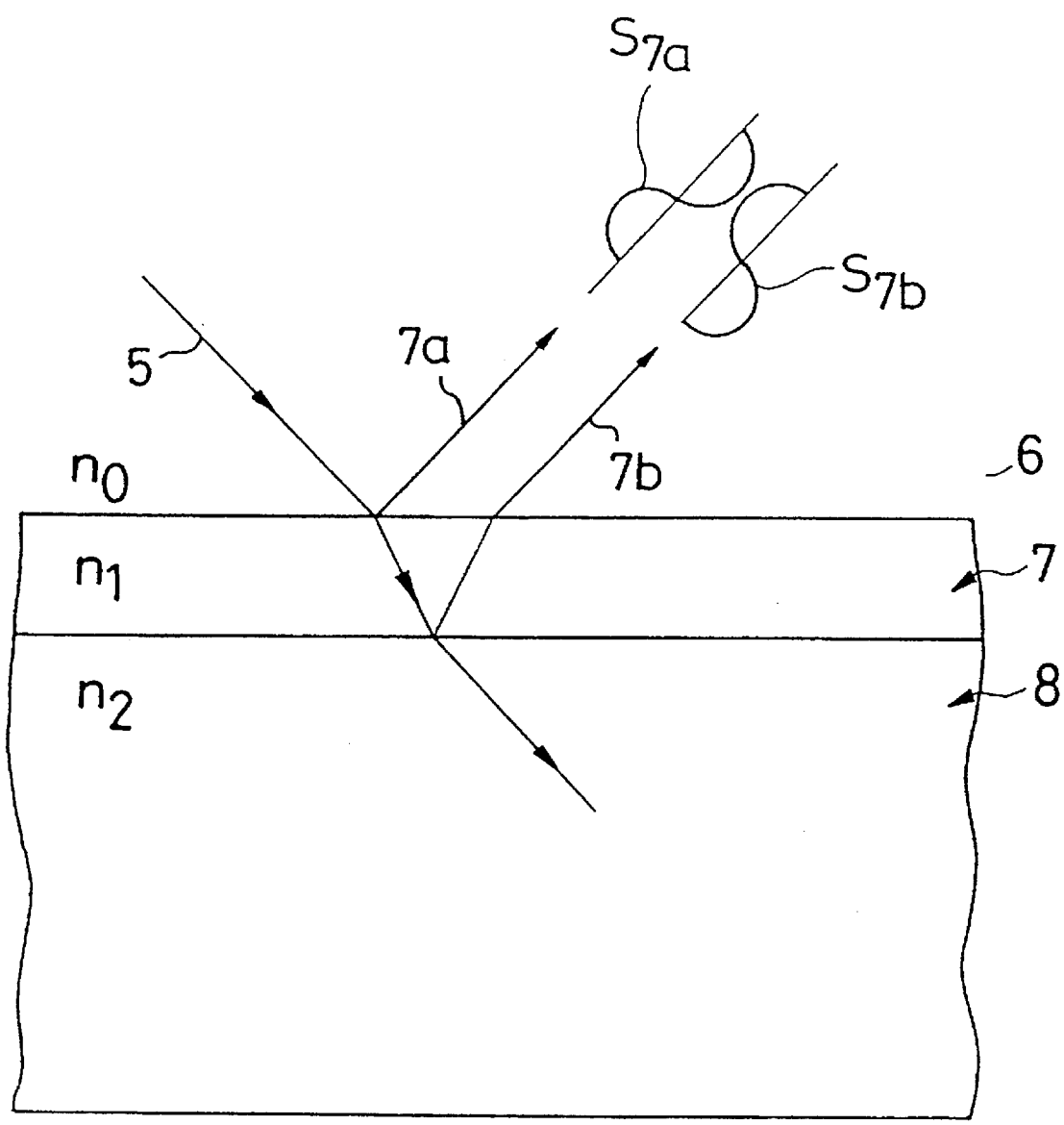
FIG. 2 is an illustration showing a non-reflection principle.

Principle of reducing reflection by the antireflection film 3 is described with reference to FIG. 2. As shown in FIG. 2, a light flux 7a is reflected by the upper face of a thin film 7 (an antireflection film), and a light flux 7b is reflected by the lower face of the thin film 7. When phases of these light fluxes 7a and 7b have a phase difference just by 180° from each other as will be described later, the light fluxes 7a and 7b are interfered with each other, thereby canceling each other. To completely cancel two reflected lights each other, respective intensities $S_{7a}$ and $S_{7b}$ of the reflected light fluxes 7a and 7b should be equal to each other. For obtaining this condition, refractive indexes on respective boundaries must be equal to each other, and it is necessary to hold the following relation:

$$n_0/n_0 = n_1/n_2 \quad (\therefore n_1 = \sqrt{n_0 \times n_2}) \tag{1}$$

wherein $n_0$ is a refractive index of an incident side medium 6 (generally air); $n_1$ is a refractive index of a thin film (an antireflection film) 7; and $n_2$ is a refractive index of a substrate 8.

According to the above-mentioned relation (1), the refractive index $n_1$ of the antireflection film 7 is a square root of a product of the refractive index $n_2$ by the refractive index $n_0$. Since the refractive index $n_0$ is generally just one (1) because of air, the refractive index $n_1$ of the antireflection film is a square root of the refractive index of the substrate 8.

A part of an incident light 5 is reflected by the upper and lower surfaces of the antireflection film 7. At that time, the reflection always occurs in the medium whose refractive index is lower than the adjacent medium. Therefore, by making a relative phase shift 180°, there appears an interference effect that the two reflected light fluxes are canceled each other. That is, when a whole phase difference is 180° which is twice as long as a quarter wavelength, an optical thickness of the film 7 has to be a quarter wavelength, and a thickness (d) of the film 7 has to be represented by the following relation:

$$d = \lambda/(4n^1) \tag{2}$$

As has been stated above, the basic antireflection film has a refractive index equal to a square root of the refractive index of the substrate, and its optical film is a single layer film having a quarter value of a wavelength of the light used.

Figure 3:
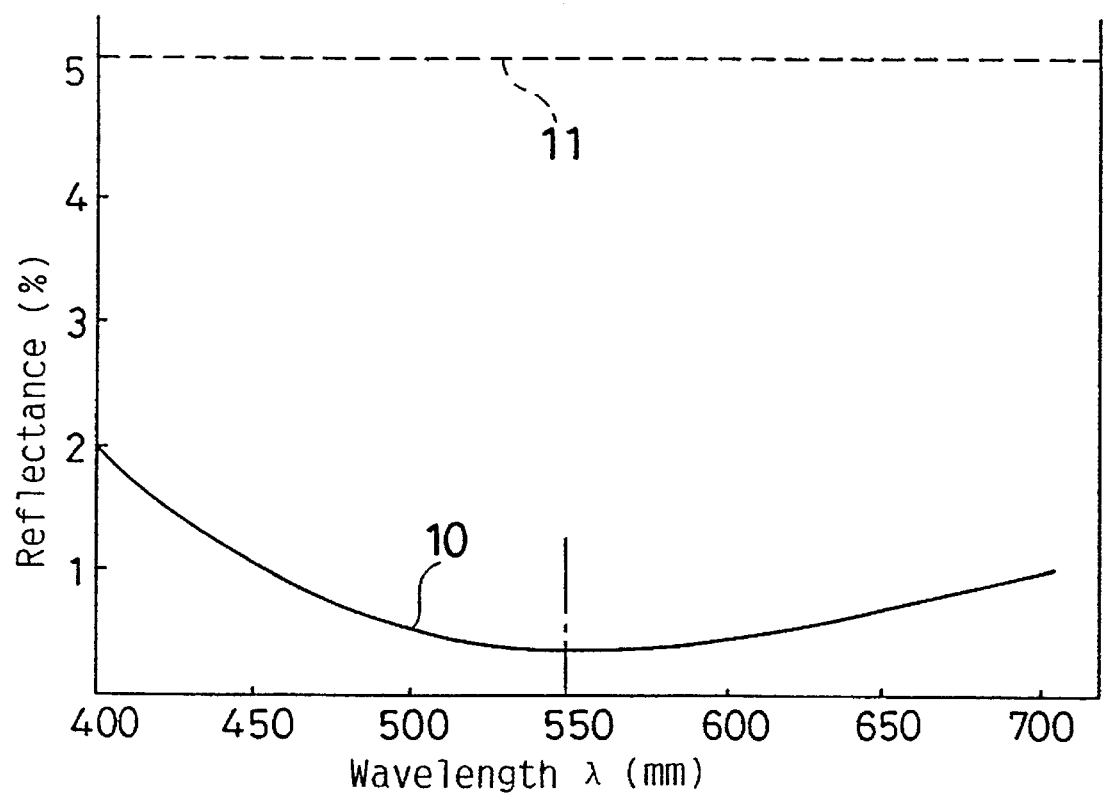
FIG. 3 is a graph showing a relation between a reflectance and a wavelength.

FIG. 3 is a graph showing a relation between the reflectance and the wavelength. As shown in FIG. 3, it is desirable to form the antireflection film 3 (FIG. 1) having the lowest reflectance at a wavelength of approximately 550 nm which is the middle of a region from 400 nm to 700 nm known as the visible region. In case a black polycarbonate resin having a reflectance 1.58 is employed as the lens-barrel 2 (FIG. 1), it is most preferable to select a material having a refractive index 1.26 ($=\sqrt{1.58}$) derived from the relation (1). For instance, the aforementioned CYTOP has a refractive index 1.34, and this index value is closest to 1.26 among the existing all materials. Also, according to the relation (2), thickness of the antireflection film 3 should be 103 nm at the wavelength 550 nm which is the approximately middle of the visible region.

By measuring and plotting the reflectances of the lens-barrel 2 in which the antireflection film 3 is formed on the polycarbonate resin with a thickness of 103 nm, a reflectance characteristic curve 10 of the CYTOP coating treatment is obtained as shown in FIG. 3. This reflectance characteristic is improved by approximately 4% in comparison with a reflectance characteristic curve 11 of the conventional lens-barrel without the antireflection film. Also, a contrast ratio of the projection lenses 4a–4e mounted to the lens-barrel 2, in which the antireflection film 3 is formed, is improved by 10–15% in comparison with the conventional one. Improvement of the contrast brings improvement of visibility of the image.

Figure 4:
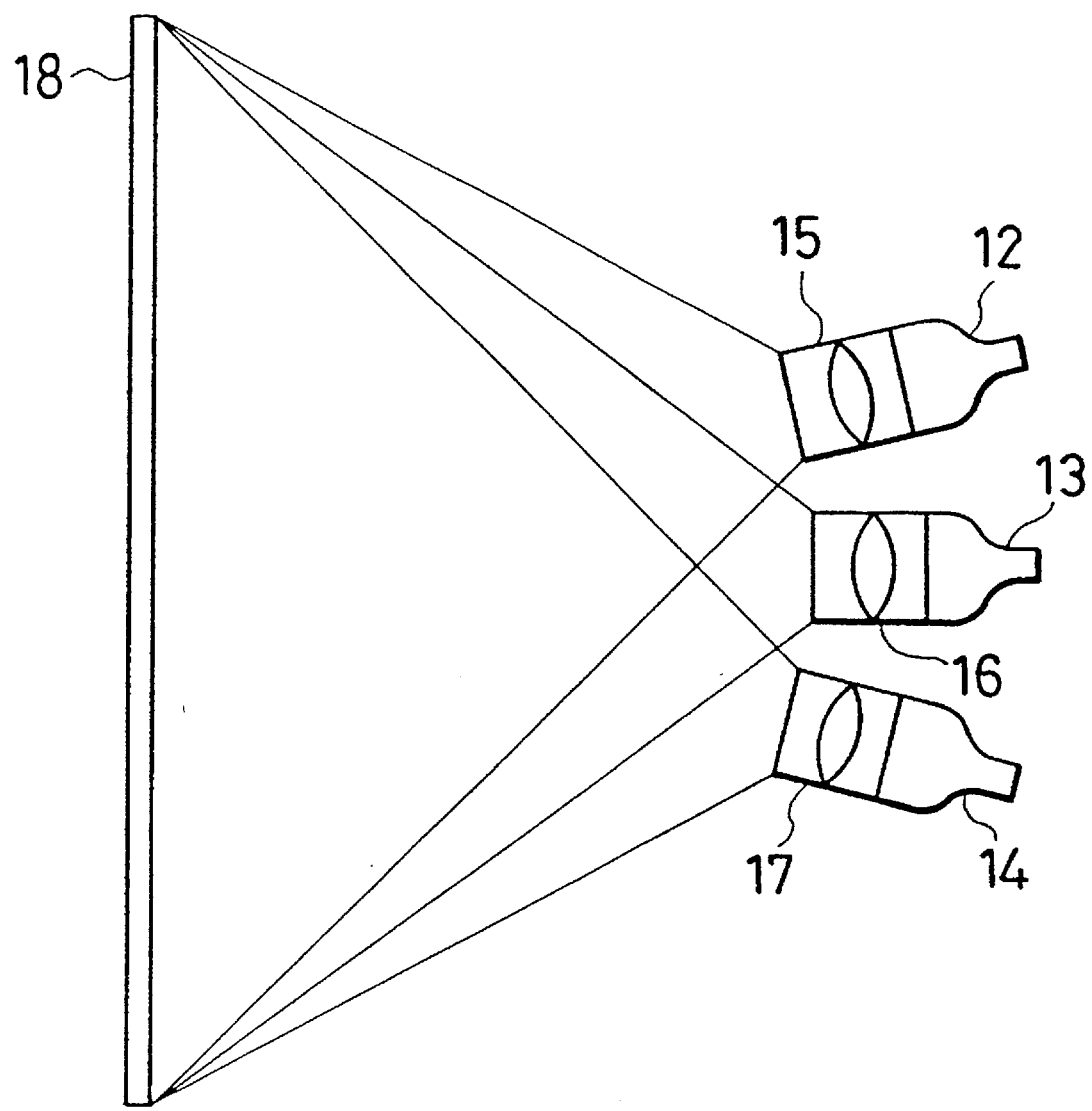
FIG. 4 is an illustration showing basic structure of a projection type TV set.

Next, a second embodiment is described with reference to FIGS. 4 and 5. FIG. 4 is an illustration showing a configuration of a projection type TV set, and FIG. 5 is a graph showing emission spectrum of CRTs and characteristics of antireflection films.

In FIG. 4, a blue CRT 12, a green CRT 13 and a red CRT 14 are provided in the projection type TV set. Images emitted from these CRTs 12, 13 and 14 are magnified through a blue projection lens holder 15, a green projection lens holder 16 and a red projection lens holder 17, respectively, thereby forming a magnified image on a screen 18.

Figure 5:
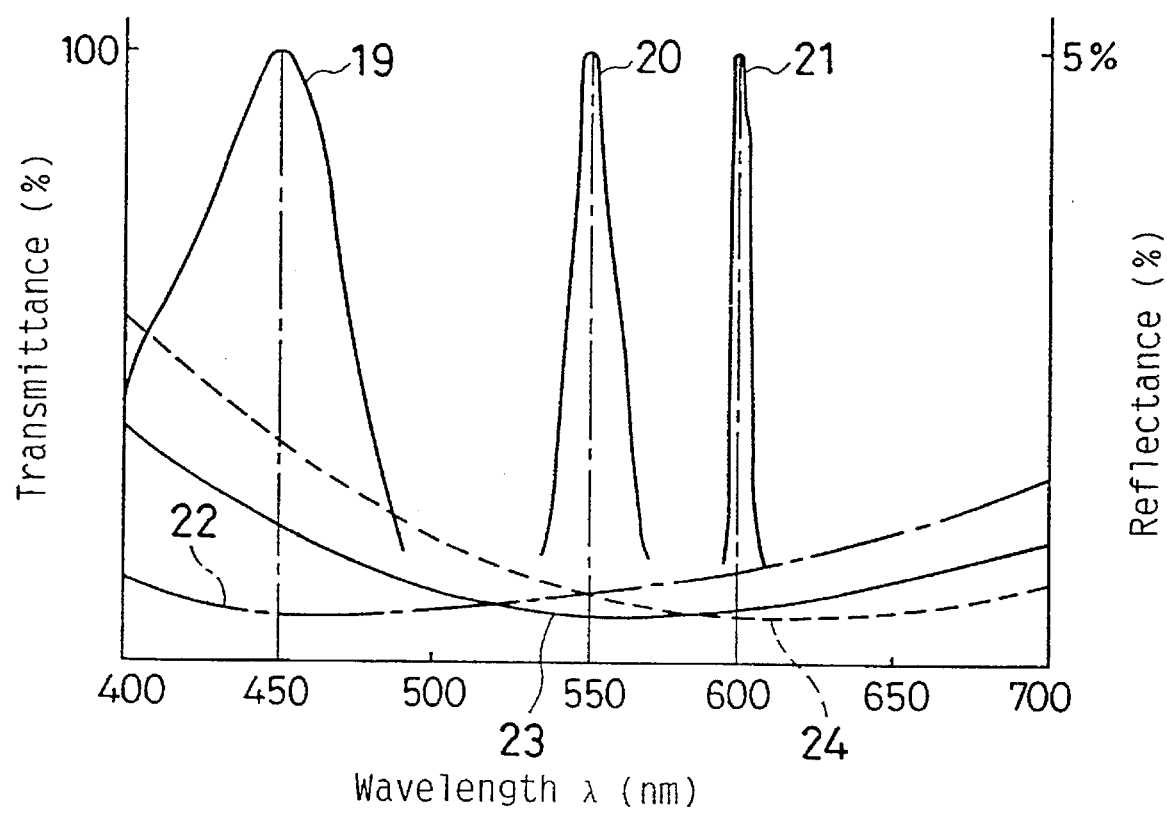
FIG. 5 is a graph showing emission spectrum of CRTs and characteristics of antireflection films.

In FIG. 5, the CRTs 12, 13 and 14 (FIG. 4) have emission spectrums 19, 20 and 21, respectively. Reflectance curves 22, 23 and 24 have characteristics corresponding to the blue, green and red spectrums, respectively, and these curves 22, 23 and 24 take the lowest value at respective wavelengths corresponding to ranges for the blue, green and red spectrums 19, 20 and 21. Since the blue emission spectrum 19 takes a peak value when the wavelength is 450 nm, the reflectance curve 22 having the lowest reflectance at the wavelength 450 nm should be selected for the blue emission. The reflectance curve 22 is derived by a film whose thickness is 84 nm. Since the green emission spectrum 20 takes a peak value when the wavelength is 550 nm, the reflectance curve 23 having the lowest reflectance at the wavelength 550 nm should be selected for the green emission. The reflectance curve 23 is derived by a film whose thickness is 103 nm. Since the red emission spectrum 21 takes a peak value when the wavelength is 600 nm, the reflectance curve 24 having the lowest reflectance at the wavelength 600 nm should be selected for the red emission. The reflectance curve 24 is derived by a film whose thickness is 112 nm. Therefore, the CYTOP coatings for blue, green and red are formed on the inner surface of the lens-barrel 2 (FIG. 1) with the predetermined thicknesses, i.e., 84 nm, 103 nm and 112 nm, respectively. As a result, though the projection lenses 15, 16 and 17 have to be provided independently, contrast and brightness of image are improved further in comparison with the first embodiment.

Next, method for making the antireflection film is described with references to FIGS. 6(A), 6(B), 6(C), 7, 8(A), 8(B) and 9.

[EXAMPLE 1]

Figure 6A:
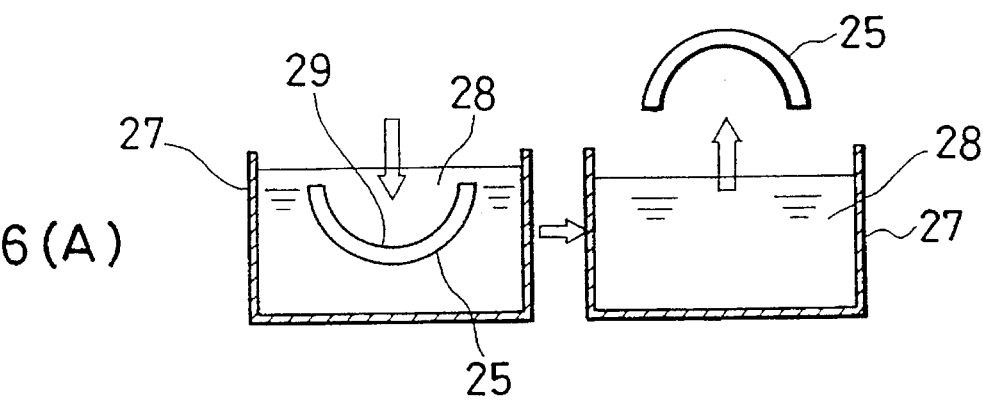
FIGS. 6(A), 6(B) and 6(C) are illustrations showing processes for making an antireflection film on a lens-barrel by means of a dipping method.
Figure 6B:
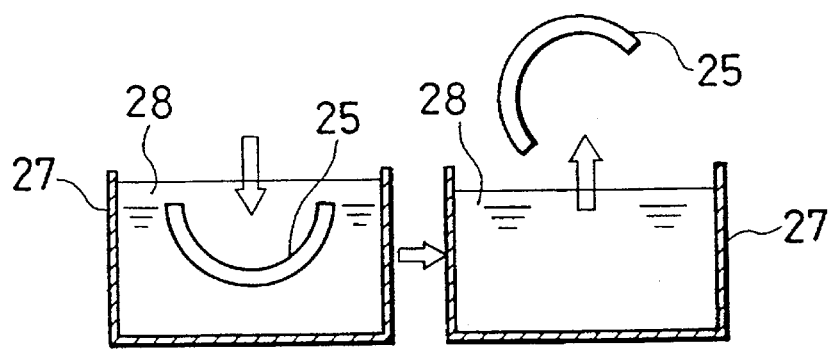
Figure 6C:
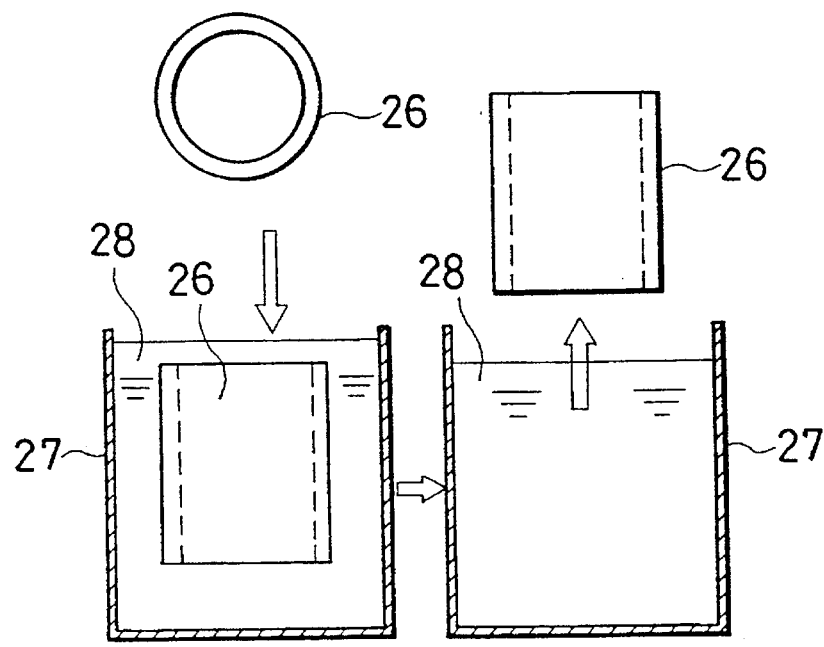

FIGS. 6(A), 6(B) and 6(C) are illustrations showing a method for making a thin film on a half body of a split type lens-barrel or a cylindrical lens-barrel through dipping processes.

A CYTOP solution 28 is stored in a dipping tank 27. This CYTOP solution 28 is CTL-102A presented by ASAHI GLASS Co., Ltd., and it consists of 2-butyltetrahydrofuran resin of 60±0.03% molality and 2-butyltetrahydrofuran solvent CT-Solv. 100. This CYTOP solution is colorless and transparent liquid, and its viscosity is equal to or lower than 10 cps.

First, in the left of FIG. 6(A), the half body 25 of the split type lens-barrel is dipped in the CYTOP solution 28 with its inner surface 29 directed toward the upper. After completion of dipping, the half body 25 is rotated by 180° so that its inner surface may be directed to the downward, and subsequently the half body 25 is raised out of the CYTOP solution 28 as shown in the right of FIG. 6(A). A thickness of film formed on the inner surface of the half body 25 is thus made even value. If the half body 25 is raised as it was in the form of the left of FIG. 6(A), there will be much CYTOP solution 28 collected in a center part 29 of the inner surface of the half body 25, thus undesirably making a thickness of film thick.

The half body 25 may be raised with rotation as shown in FIG. 6(B) so that a thickness of the film may be made uniform.

In case the lens-barrel 26 is of cylindrical shape as shown in FIG. 6(C), the lens-barrel 26 is vertically dipped in the CYTOP solution 28, keeping its axial direction vertical. Next, as shown in the right of FIG. 6(C), the lens-barrel 26 is raised out of the solvent 28, keeping its axial direction vertical. After completion of raising, a solution film on the lens-barrel 26 is air-dried and subsequently heat-hardened at the temperature from 70° C. to 110° C.

Heat hardening temperature is selected to be suitable for a material used for the lens-barrel. For example, a heat hardening temperature for polycarbonate resin, which is an excellent heat-resisting material, may be 100° C.; and a heat hardening temperature for a resin such as ABS, which is not a heat-resisting material, is 70° C.

Figure 7:
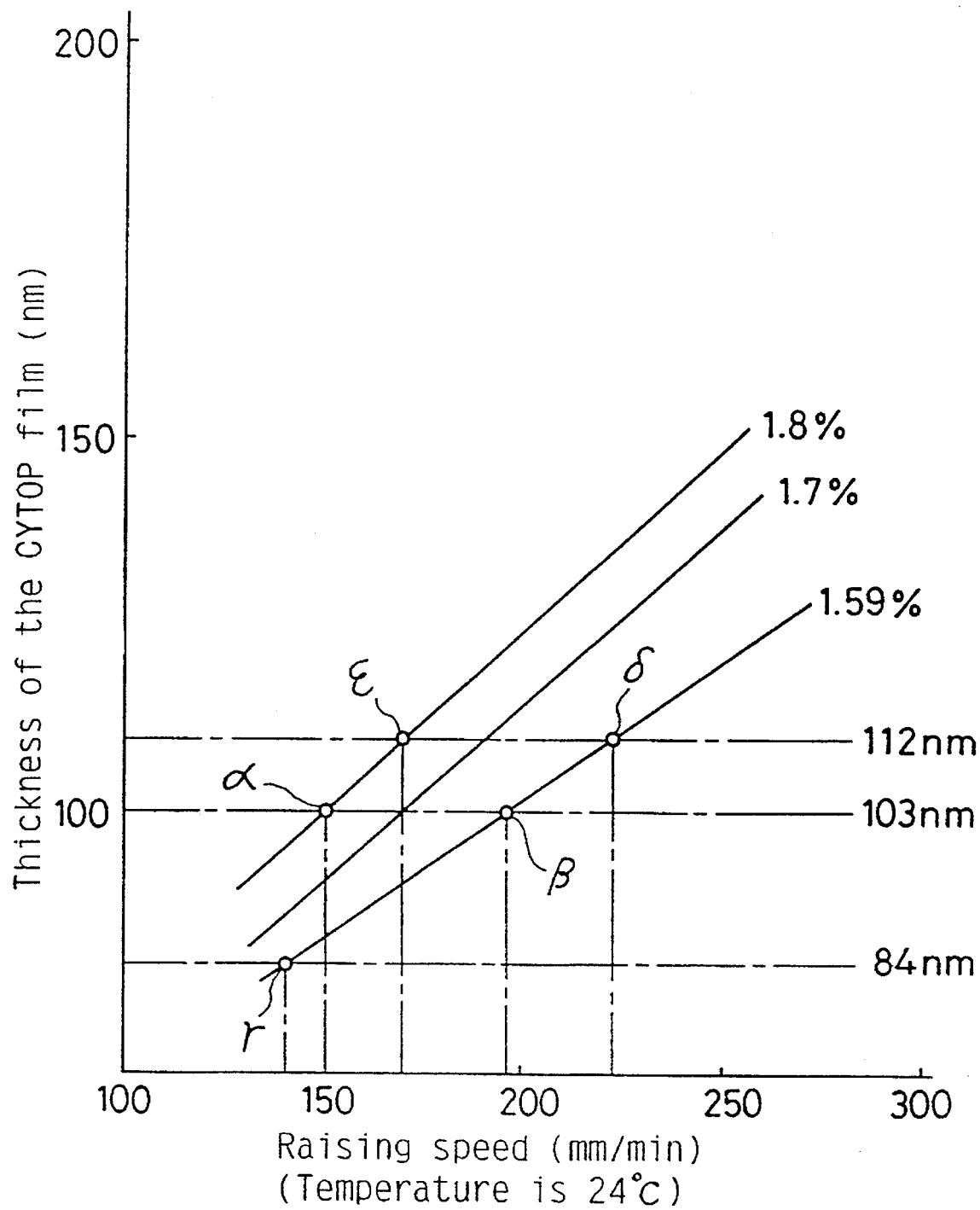
FIG. 7 is a graph showing relations between a raising speed and a density of a CYTOP (Trademark) solvent.

FIG. 7 is a graph showing a relation between a raising speed and a thickness of film on condition that a liquid temperature is 24° C. When a clear and low-refractive-index CYTOP is used, a desirable raising speed is obtained by the graph shown in FIG. 7. For example, to obtain 103 nm thickness from a solution whose density is 1.8%, a raising speed at an intersection point α between a 103 nm-line and a 1.8%-line is 150 mm/min. In case a density of the solution is 1.59%, a raising speed at an intersection point β between the 103 nm-line and a 1.59%-line is 196 mm/min.

As aforementioned, a reflectance at the peak of the blue emission spectrum is made minimum under a condition that a film thickness is 84 nm. Therefore, a raising speed at an intersection point τ between a 84 nm-line and the 1.59%-line is 140 mm/min. Also, a reflectance of the red emission spectrum becomes minimum under a condition that a film thickness is 112 nm. Therefore, in case a density of the solution is 1.59%, a raising speed at an intersection point δ of a 112 nm-line and the 1.59%-line is 223 mm/min. In case a density of the solution is 1.8%, a raising speed at an intersection point ε of the 112 nm-line and the 1.8%-line is 170 mm/min.

Thus, by selecting a specific combination among a CYTOP density, a raising speed and a temperature, a film thickness can be freely controlled. This supports the former description that the film thickness is controllable in accordance with the blue, green or red emission spectrum.

[EXAMPLE 2]

Figure 8A:
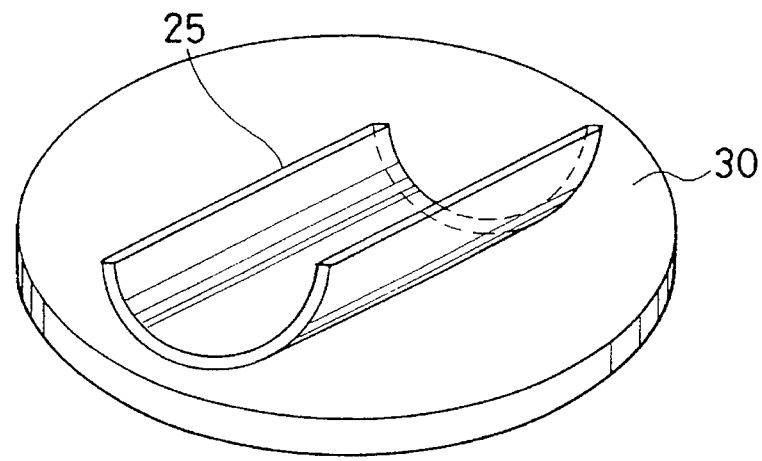
FIG. 8(A) is a perspective view showing a half body of a lens-barrel disposed on a rotating table.
Figure 8B:
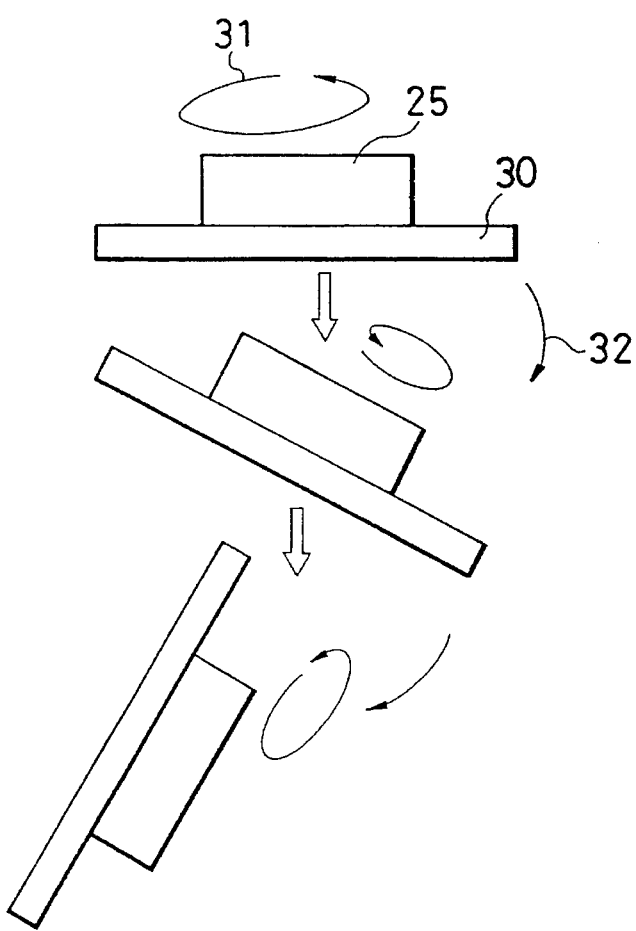
FIG. 8(B) is a side view showing processes for making an antireflection film by the spin coating method.

A method for forming a thin film according to a spin coating method is described with reference to FIGS. 8(A) and 8(B). In FIG. 8(A), the half body 25 of the split type lens-barrel is horizontally fixed on a rotating table 30 by a fixture (not shown). Next, a predetermined quantity of the CYTOP solution is dropped onto the inner surface of the half body 25. Next, the rotating table 30 is horizontally rotated as shown by a curved arrow 31 in FIG. 8(B), and the rotating table 30 is vertically revolved as shown by a curved arrow 32. An excessive quantity of the CYTOP solution is thus detached from the inner surface of the half body 25, thereby forming a film having a uniform thickness. A thickness of the film can be controlled by properly combining three factors, i.e., a density of the CYTOP solution, a rotating speed and a temperature.

[EXAMPLE 3]

Figure 9:
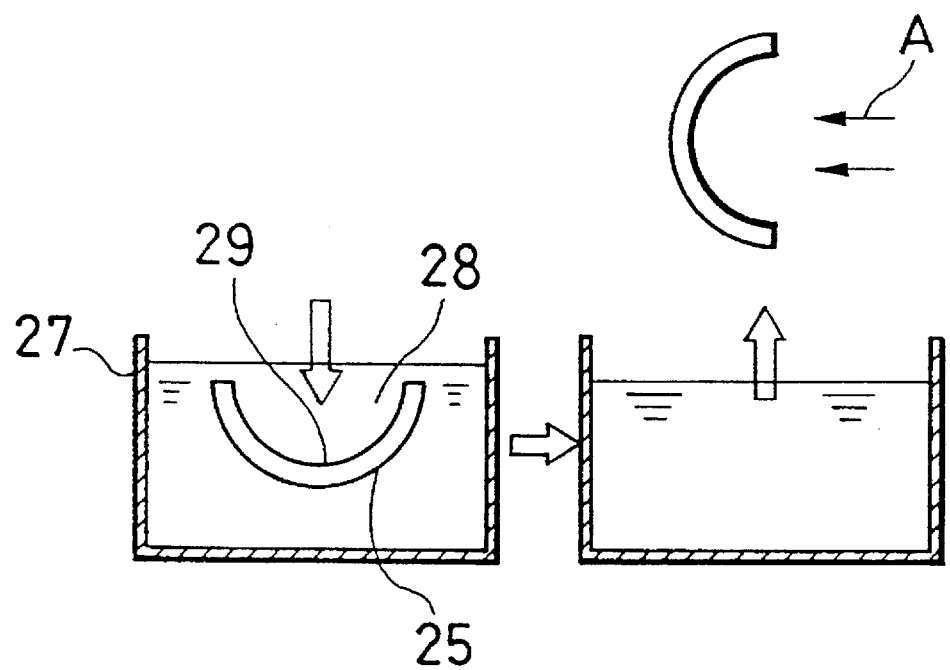
FIG. 9 is an illustration showing processes for making an antireflection film on a lens-barrel by means of a dipping and blowing method.

Another method for forming a uniform thin film is described with reference to FIG. 9. In FIG. 9, the half body 25 is dipped in the CYTOP solution 28. Next, the half body is raised out of the dipping tank 27, and compressed air having a predetermined pressure is blown against the inner surface of the half body 25 as shown by an arrow A. An excessive quantity of the CYTOP solution is thus blown off from the inner surface of the half body 25, thereby forming a uniform-thickness film on the inner surface of the half body 25. Thickness of the film can be controlled by properly combining three factors, i.e., the density of the CYTOP solution, a blowing pressure of the air and the temperature.

Although the above-mentioned description is made about the lens-barrel which is one member of the lens holder, the description is also applicable to any other members other than the lens-barrel. For instance, as shown in FIG. 1, the thin film coating of the present invention may be applied to the coupler 40, which combines the CRT with the lenses 4a–4e, lens fixing nuts (not shown), lens positioning spacers (not shown) or lens fixing rings (not shown).

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for making a thin film comprising the steps of:

dipping a lens holder into a solution comprising a solvent and a fluororesin compound, said fluororesin compound having a refractive index lower than a refractive index of a lens barrel of said lens holder;

determining a raising speed of said lens holder to provide a desired thickness of said thin film, said thickness of said thin film being dependent upon the raising speed and the density of said solution, raising said lens holder out of said solution at said raising speed to provide said thin film; and removing said solvent to thereby form said thin film.

2. A method for making a thin film comprising the steps of:

dipping a lens holder into a solution comprising a solvent and a fluororesin compound, said fluororesin compound having a refractive index lower than a refractive index of a lens barrel of said lens holder;

determining a raising speed of said lens holder to provide a desired thickness of said thin film, said thickness of said thin film being dependent upon the raising speed and the density of said solution, raising said lens holder out of said solution at said raising speed to provide said thin film; and blowing said lens holder with a compressed air to remove said solvent and thereby form said thin film.

3. A method for making a thin film comprising the steps of:

dripping a solution comprising a solvent and a fluororesin compound onto a lens holder;

rotating said lens holder in two directions perpendicular to each other; and removing said solvent to thereby form said thin film.

4. A method for making a thin film on a lens holder to reduce a reflection of light caused by an index difference between a refractive index of air and a refractive index of a lens-barrel of the lens holder, the method comprising the steps of:

dipping a lens holder into a solution comprising a solvent and a fluororesin compound, the fluororesin compound having a refractive index lower than a refractive index of the lens-barrel of the lens holder;

removing the lens holder from the solution; and removing the solvent to thereby form a thin film comprising the fluororesin compound on the lens holder.

5. The method according to claim 4, wherein the refractive index of the fluororesin compound is less than 1.38.

6. The method according to claim 4, further comprising the steps of providing a thickness of the thin film which provides lowest reflectance at a peak value of the light wavelength projecting through the lens holder by formula:

$$d=\lambda/(4n_1),$$

where d is the thickness of said thin film, $\lambda$ is the wavelength of said light, and $n_1$ is the refractive index of said film.

7. The method according to claim 6, wherein the refractive index of the fluororesin compound is less than 1.38.

8. A method for making a thin film on a lens holder to reduce a reflection of light caused by an index difference between a refractive index of air and a refractive index of a lens-barrel of the lens holder, the method comprising the steps of:

dripping a solution comprising a solvent and a fluororesin compound onto the lens holder, the fluororesin compound having a refractive index lower than a refractive index of the lens-barrel of the lens holder;

rotating the lens holder in two directions perpendicular to each other; and removing the solvent to thereby form a thin film comprising the fluororesin compound on the lens holder.

9. The method according to claim 8, further comprising the steps of providing a thickness of the thin film which provides the lowest reflectance at a peak value of the light wavelength projecting through the lens holder.

10. A method for making a thin film on an inner surface of a lens barrel of a lens holder to prevent reflection of stray light contacting said inner surface of said lens barrel, the method comprising the steps of:

determining a thickness of said thin film which reduces the reflectance of a wavelength of stray light contacting said inner surface of said lens barrel by formula:

$$d=\lambda/(4n_1),$$

where d is the thickness of said film, $\lambda$ is the wavelength of said stray light, and $n_1$ is the refractive index of said film;

dipping said lens holder into a solution comprising a solvent and a fluororesin compound, said fluororesin compound having a refractive index lower than a refractive index of a lens barrel of said lens holder;

raising said lens holder out of said solution, a raising speed of said lens holder and a density and temperature of said solution being adjusted to provide said thickness of said thin film; and removing said solvent to thereby form said thin film.

11. A method for making a thin film on an inner surface of a lens barrel of a lens holder to prevent reflection of stray light contacting said inner surface of said lens barrel, the method comprising the steps of:

determining a thickness of said thin film which reduces a reflectance of a wavelength of stray light contacting said inner surface of said lens barrel by formula:

$$d=\lambda/(4n_1),$$

where d is the thickness of said film, $\lambda$ is the wavelength of said stray light, and $n_1$ is the refractive index of said film;

dripping a solution comprising a solvent and a fluororesin compound onto said lens holder, the fluororesin compound having a refractive index lower than a refractive index of said lens-barrel of said lens holder;

rotating said lens holder in two directions which are substantially perpendicular to each other, a rotating speed of said lens holder and a density and temperature of said solution being adjusted to provide said thickness of said thin film, and removing said solvent to thereby form said thin film.

\* \* \* \* \*